US008628426B2

(12) United States Patent
Shimojo

(10) Patent No.: US 8,628,426 B2
(45) Date of Patent: Jan. 14, 2014

(54) ILLUSION GENERATING SYSTEM

(75) Inventor: Shinsuke Shimojo, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 13/477,286

(22) Filed: May 22, 2012

(65) Prior Publication Data

US 2012/0231893 A1    Sep. 13, 2012

Related U.S. Application Data

(62) Division of application No. 11/851,497, filed on Sep. 7, 2007, now Pat. No. 8,206,229.

(60) Provisional application No. 60/842,820, filed on Sep. 7, 2006.

(51) Int. Cl.
*A63J 5/00* (2006.01)

(52) U.S. Cl.
USPC .............................................. 472/57; 472/63

(58) Field of Classification Search
USPC ............................................................ 472/57
See application file for complete search history.

(56) References Cited

U.S. PATENT DOCUMENTS

| 569,503 | A | * | 10/1896 | Keyes | 359/851 |
| 5,255,028 | A | * | 10/1993 | Biles | 353/7 |
| 5,685,625 | A | * | 11/1997 | Beaver | 353/28 |
| 6,513,941 | B1 | * | 2/2003 | Perrier et al. | 362/11 |

* cited by examiner

*Primary Examiner* — Michael Dennis
(74) *Attorney, Agent, or Firm* — Lyon & Harr, LLP; Richard T. Lyon

(57) ABSTRACT

The system provides a tristable environment that effects reorientation of horizontal and vertical surfaces at a human scale. The system allows the engagement and disengagement of the effect via movement of the observer without loss of the intensity of the effect. The system also provides a combined vection/motion induced blindness environment at human scale with interactivity available to non-trained participants.

7 Claims, 2 Drawing Sheets

ILLUSION GENERATING SYSTEM

CROSS REFERENCE TO RELATED APPLICATION

This application is a divisional of a prior application entitled "ILLUSION GENERATING SYSTEM", which was assigned Ser. No. 11/851,497 and filed Sep. 7, 2007, and which claimed the benefit of and priority to provisional U.S. patent application Ser. No. 60/842,820, filed Sep. 7, 2006. This application claims the benefit of and priority to the aforementioned prior application and provisional.

FIELD OF THE INVENTION

The invention relates generally to a system and method for providing illusions as part of an installation environment.

BACKGROUND OF THE INVENTION

The use of specially constructed rooms and environments to demonstrate optical and perceptual illusions is known in the art. There are a number of attractions that use forced perspective techniques to make an object or person appear farther, closer, larger or smaller than it actually is. These environments fool human visual perception through the use of scaled objects and the correlation between them and the vantage point of the spectator or camera. A disadvantage of such environments is that they are often "monostable", that is, the desired visual effect is only perceived from a single location or a narrow range of adjacent locations. Another disadvantage is a loss of effectiveness when a user has observed the environment from a point that reveals the trick, a return to the monostable point of observation lacks the impact of the original viewing.

Another disadvantage of prior art optical and perceptual illusion environments is the lack of interactivity among participants, particularly among third party visitors. In some cases, employees or actors in an installation are required to provide a certain kind of interactivity with the environment, but it is often desired for lay users of an installation to be able to enjoy features and interactivity among themselves, without guided help.

One type of effect is a reorientation of horizontal, vertical, and level surface perception of a viewer/user. Certain effects have been reported in Howard, I. P. and Childerson, L. (1994) The Contribution Of Motion, The Visual Frame, And The Visual Polarity To Sensations Of Body Tilt. Perception, 23, 753-762; Howard, I. P., Hu, G., Saxe, R. and Zacher, J. E. (2005) Visual Orientation In A Mirror World Tilted 90 Degrees. Perception, 34, 7-15; and Howard, I. P. and Hu, G. (2001) Visually Induced Reorientation Illusions. Perception, 30, 583-600. These prior art approaches require the use of a mirror or some other optical device for operation. Other approaches have been described in Hudson, T. E., Li, W. X. and Matin, L. (2000) Independent Mechanisms Produce Visually Perceived Eye Level (VPEL) And Perceived Visual Pitch (PVP). Vision Research, 2605-2619; Matin, L. and Li, W. X. (1995) Multimodal Basis For Egocentric Spatial Localization And Orientation. Journal Of Vestibular Research-Equilibrium & Orientation, 5, 499-518; and Matin, L. and Li, W. X. (1992) Mislocalizations Of Visual Elevation And Visual Vertial Induced By Visual Pitch--The Great-Circle Model. Annals of The New York Academy of Sciences 656, 242-265. These manipulations have mainly focused on a limited visual cues (such as bars) and the effects reported been relatively minor.

Another effect is "vection", namely the implied sense of motion of a stationary user based on the actual motion of other objects which is described in Fischer, M. H. & Kornmuller, A. E. (1930) Optkinetish Ausgeloste Bewegungswahrnehmungen Und Optkinetisher Nystagmus. Journal fur Pscyholige and Neurologie (Leipzig), 41, 273-308.

A third prior art effect is motion induced blindness discussed in Bonneh, Y S, Cooperman, A. and Sagi, D. (2001) Motion-Induced Blindness In Normal Observers. Nature, 411, 798-801.

These techniques have been limited to small objects in scope and have not proven to be applicable in tandem and at a human scale.

SUMMARY

The system provides a tristable environment that effects reorientation of horizontal and vertical surfaces at a human scale. The system allows the engagement and disengagement of the effect via movement of the observer without loss of the intensity of the effect. The system also provides a combined vection/motion induced blindness environment at human scale with interactivity available to non-trained participants.

DETAILED DESCRIPTION

The system provides a robust and repeatable effect in a tristable perception environment and also provides a combined vection/MIB environment.

Tristable Environment

Figure 1:
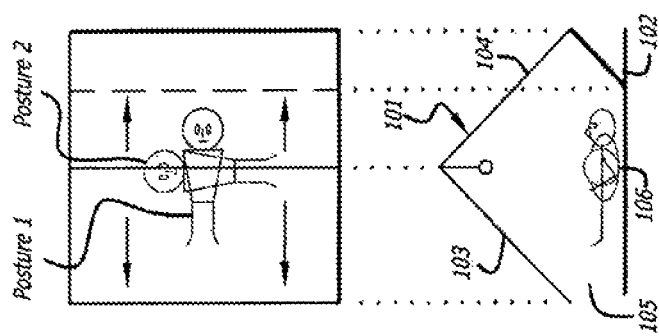
FIG. 1 is a top and side view of an embodiment of a reorientation environment.

FIG. 1 is an illustration of an embodiment of a reorientation environment of the system. FIG. 1 illustrates a top and side view of an installation of an embodiment of the system. Referring first to the side view, the entire structure of a room 101 is tilted except for the floor 102, which is physically horizontal (imagine lifting an ordinary house or room, rotating it in the air and then placing it on the on one of its corners). The angle of the tilt may be within the range of 40-50 degrees. The room size can be human scaled such that two or more observers 106 can be in the room 101 and observe the room interior from a sitting or supine position.

The entrance 105 to the room can be made low or closable to prevent the outside of the room from serving as a visible frame of reference for the observer 106. The interior of the room 101 includes a first surface 103 decorated or finished as a ceiling and a second surface 104 decorated or finished as a wall. The decorating and finishes can include items, such as shelves, frames of painting, pillars etc. that are orthogonal to the tilted frame of reference rather than the physical horizontal and vertical. This can be accomplished by fastening three dimensional items to surfaces 103 and 104. In one embodiment, surfaces 103 and 104 are decorated in such a way that they can be interpreted as either wall or ceiling depending on the user's orientation.

Referring now to the top view of FIG. 1 we observe the three states (tristable positions) of the system. Posture 1 is a viewer 106 orientation that presents one desired optical effect. Viewer 106 in Posture 1 will perceive surface 103 as the ceiling of room 101 and surface 104 as a wall of room 101. The viewer 106 will perceive surface 103 as being directly above the viewer and horizontal to the plane, while perceiving himself to be on a sloped floor, in spite of the fact that the viewer is in fact horizontal. Similarly, at a position 180 degrees from Posture 1 (and not shown in FIG. 1) the user will experience a similar perception, but with surface 104 now appearing as a level ceiling and surface 103 now appearing as an upright wall.

At Posture 2, (or its orthogonal, not shown) viewer 106 will perceive room 101 in its true state and will experience a room turned on its corner, with no false orientation. The same effect takes place if the viewer 106 is sitting upright in room 101.

Figure 2:
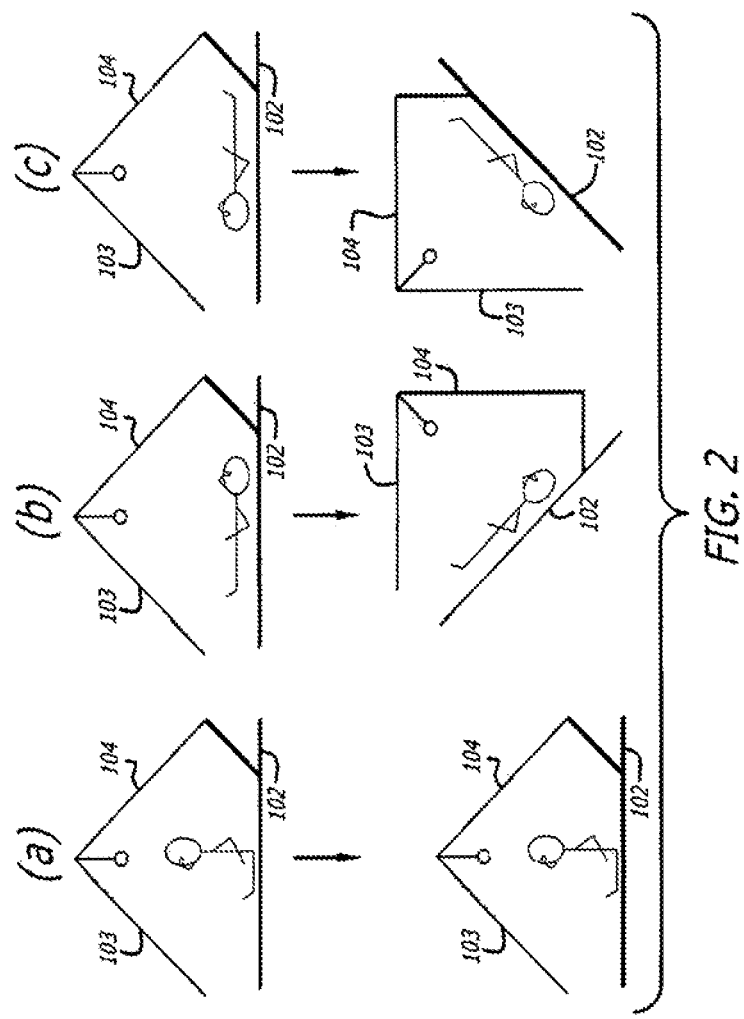
FIG. 2 is a view illustrating the perception effect of the tristable states of the embodiment of FIG. 1.

FIG. 2 illustrates the perception of the viewer in the three tristable locations. When the observer stands or sits in the upright position at position A, nothing happens. Perception of the surrounding space is as it is physically in reality. The floor 102 on which the observer lies is horizontal, and all the other surfaces of the room including the walls and the ceiling (103, 104) appear to tilt properly. When the observer lies flat on the floor as in position B, however, the percept changes dramatically. Now the entire room appears upright and normal, the surface 103 immediately above the observer appears as a horizontal ceiling and the other surface 104 appears as a vertical wall. Meanwhile, the floor 102 appears to tilt and indeed, the observer feels that s(he) is about to slip down on a steep slope. This perceptual switch of frame of reference is instantly noticeable, and the orientation of everything inside the room is judged in accordance with this new frame of reference (defined by the walls and the ceiling), rather than the physical frame. Thus, a surface of water in a glass, a pendulum, a person standing on one foot, a balloon constrained by a string, and a balancing toy all appear to tilt. A ball on a rail (which is slightly tilted with regard to the physical coordinate) may appear to spontaneously roll uphill, etc.

When the user orients himself in the third of the tristable locations as in position C, the surface 104 now appears as the ceiling and surface 103 appears as a vertical wall. In this position the viewer feels that he or she is on a slanted floor 102 with the feet above the head, even though the observer is horizontal.

The system allows observers to freely change their postures in a very natural living room type of environment, to demonstrate how critical the posture as a factor to the illusion. Indeed in supine position, the room typically appears to be precisely upright (not just towards that direction), and it is again very difficult to "correct" the percept by knowledge.

This freedom of posture on the observer's side makes this demonstration particularly suitable for a museum type of setting. The effect occurs particularly when the observer lies along the direction of the tilt, that is, only when the observer's spinal axis is approximately perpendicular to the axis of rotation of the room. When the observer lies along the axis of room rotation, for example, the percept is veridical and very stable. Second, when the supine observer lies in the direction of room tilt, and slowly raises up her(his) head and upper body towards upright posture, the perceptual frame of reference suddenly shifts from the illusory one to the veridical one at one point. Third and most intriguingly, there is a third percept possible when the observer is in the supine position in the direction of rotation, but with the head on the opposite side with regard to the direction of the room rotation.

The tristable states of the system result in a consistently repeatable effect and impression compared to prior art approaches. The immersive environment results in the effect being substantially irresistible even when the user is aware of the true orientation of the room. In fact, in one embodiment of the system, the floor 102 is implemented as a turntable that can rotate a supine viewer from one of the tristable positions to another and the viewer will consistently feel the same strong feeling and impression of the effect as the viewer rotates repeatedly through each position.

Combined Vection/MIB Environment

Figure 3:
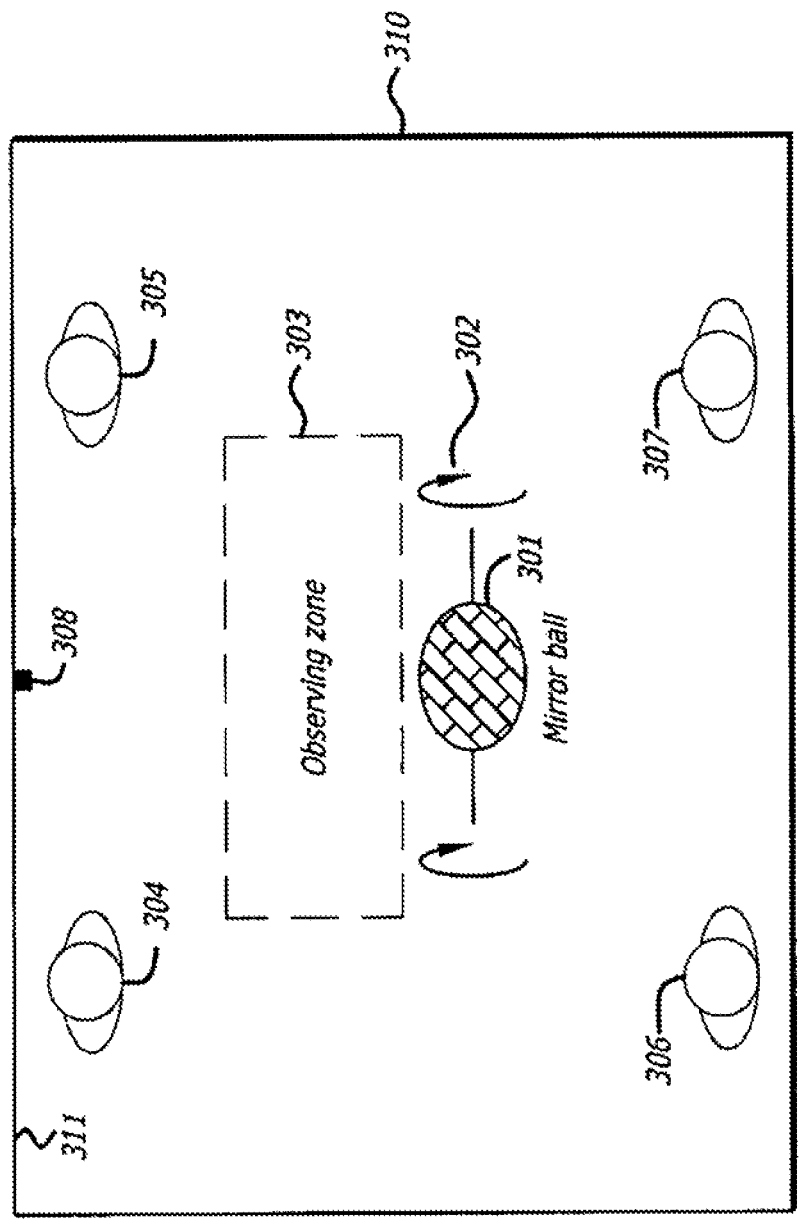
FIG. 3 is a diagram of a combined vection/MIB environment of the system.

Another embodiment of the system provides an environment that combines vection with motion induced blindness effects. The hybrid environment also permits the interactivity in the visual effect by untrained observers in the environment. An example of an embodiment of the system is illustrated in FIG. 3. A mirror ball 301, such as one can often found in a discotheque, is installed with light sources on a ceiling of a room 310 (in one embodiment the mirror ball is ellipsoid-shaped, rather than the typical spherical mirror ball, but a spherical one will work as well). The mirror ball 301 rotates by an electric servo motor whose rotation speed is configured at a relatively low and stable level (e.g. 0.7.about.1.1 m/sec velocity in the projection onto the front wall 311). In one embodiment the direction of rotation can be selectively reversed via a switch box. A light source (not shown) can be any type of spotlight spotting the mirror ball 301. The number of light sources that is necessary for the demonstration depends on the resulting density of light blobs drifting on the room walls with a wide variety of densities able to provide the desired effect. To avoid shadows the light sources may be placed on the ceiling.

In an alternate embodiment, the mirror ball and light combination may be replaced with a cylinder or ellipsoid having a light disposed therein with openings or transparencies on the surface of the cylinder to allow light to pass through. In one embodiment, the openings are distributed about the cylinder in a pseudo random pattern or non-periodic manner for projection on a wall and/or ceiling surface.

I claim:

1. An illusion generating apparatus for creating a reorientation environment for a human observer, comprising: a horizontal floor sized such that the observer is able to lie flat on the floor in any rotational position; a first planar surface; and a second planar surface which is in physical contact with a top edge of the first planar surface, wherein, the first and second planar surfaces are approximately orthogonal to each other, both the first planar surface and the second planar surface are physically positioned at approximately 45 degrees to the floor, a line of physical contact between the second planar surface and the top edge of the first planar surface is physically positioned a prescribed vertical distance above the floor and is substantially centered there-over, and the observer can be physically positioned in different postures on the floor; wherein the floor comprises a turntable for rotating the observer.

2. The apparatus of claim 1, wherein whenever the observer is physically positioned in a posture comprising the observer being substantially centered on the floor and lying face-up and flat thereon such that his head is vertically beneath the second planar surface and his feet are vertically beneath the first planar surface, the first planar surface visually appears to the observer to be a horizontal ceiling,
the second planar surface visually appears to the observer to be a vertical wall, and
it visually appears to the observer that the floor is sloped.

3. The apparatus of claim 1, wherein whenever the observer is physically positioned in a posture comprising the observer being substantially centered on the floor and lying face-up and flat thereon such that his head is vertically beneath the first planar surface and his feet are vertically beneath the second planar surface,
    the first planar surface visually appears to the observer to be a vertical wall,
    the second planar surface visually appears to the observer to be a horizontal ceiling, and
    it visually appears to the observer that the floor is sloped.

4. The apparatus of claim 1, wherein,
    the prescribed vertical distance is sized such that the observer is able to sit upright whenever he is substantially centered on the floor, and
    whenever the observer is physically positioned in a posture comprising the observer being substantially centered on the floor and sitting upright thereon, the floor, the first planar surface, and the second planar surface visually appear to the observer to be in their true state with no false orientation.

5. The apparatus of claim 1, wherein,
    the prescribed vertical distance is sized such that the observer is able to stand whenever he is substantially centered on the floor, and
    whenever the observer is physically positioned in a posture comprising the observer being substantially centered on the floor and standing thereon, the floor, the first planar surface, and the second planar surface visually appear to the observer to be in their true state with no false orientation.

6. The apparatus of clam 1, wherein,
    a bottom edge of the first planar surface is separated from the floor by another prescribed vertical distance,
    said separation serves as an entrance to the reorientation environment, and
    said separation is made either low or closable to prevent an outside of the environment from serving as a visible frame of reference for the observer.

7. An illusion generating apparatus for creating a reorientation environment for a human observer, comprising: a horizontal floor sized such that the observer is able to lie flat on the floor in any rotational position; a first planar surface; and a second planar surface which is in physical contact with a top edge of the first planar surface, wherein, the first and second planar surfaces are approximately orthogonal to each other, both the first planar surface and the second planar surface are physically positioned at a 40 to 50 degree angle to the floor, a line of physical contact between the second planar surface and the top edge of the first planar surface is physically positioned a prescribed vertical distance above the floor and is substantially centered there-over, and the observer can be physically positioned in different postures on the floor underneath said line of physical contact between the second planar surface and the top edge of the first planar surface; wherein the floor comprises a turntable for rotating the observer.

* * * * *